United States Patent
Kittredge et al.

(10) Patent No.: US 7,103,627 B2
(45) Date of Patent: Sep. 5, 2006

(54) WEB-BASED SYSTEM AND METHOD

(75) Inventors: Todd H. Kittredge, Centerville, MA (US); Mark J. Stacy, Marstons Mills, MA (US); Joseph F. Cammarano, Centerville, MA (US); Troy DiCostanzo, Centerville, MA (US)

(73) Assignee: Infinium Software, Inc., Hyannis, MA (US)

( * ) Notice: Subject to any disclaimer, the term of this patent is extended or adjusted under 35 U.S.C. 154(b) by 649 days.

(21) Appl. No.: 10/040,041

(22) Filed: Dec. 31, 2001

(65) Prior Publication Data

US 2003/0135543 A1    Jul. 17, 2003

(51) Int. Cl.
*G06F 15/16* (2006.01)

(52) U.S. Cl. .................. 709/201; 709/203; 715/522; 717/136; 719/311

(58) Field of Classification Search ............. 709/203, 709/204, 214, 216, 219, 223, 224, 201, 217, 709/230, 238, 245; 715/514–517, 522; 717/136; 719/311
See application file for complete search history.

(56) References Cited

U.S. PATENT DOCUMENTS

| 5,745,692 | A | 4/1998 | Lohmann, II et al. ...... 709/223 |
| 6,427,063 | B1 * | 7/2002 | Cook et al. ................. 434/350 |
| 6,606,479 | B1 * | 8/2003 | Cook et al. ................. 434/350 |
| 6,768,994 | B1 * | 7/2004 | Howard et al. ............ 709/218 |
| 6,961,900 | B1 * | 11/2005 | Sprague et al. ............ 715/513 |

OTHER PUBLICATIONS

Box, D. et al.; "Simple Object Access Protocol (SOAP) 1.1"; retreived from Internet, www.w3c.org; dated May 8, 2000.*

* cited by examiner

*Primary Examiner*—Marc D. Thompson
(74) *Attorney, Agent, or Firm*—Wilmer Cutler Pickering Hale and Dorr LLP (57) ABSTRACT

A system and method for converting/generating web application programs is disclosed so that the system user or developer may perform substantially all activities with respect to a web application at the web browser level rather that at the web server or application server level to effect changes in the web application operation.

65 Claims, 4 Drawing Sheets

WEB-BASED SYSTEM AND METHOD

FIELD OF THE INVENTION

The present invention relates to systems and methods that may be used to create multiple interfaces to a computer-based system. More specifically, the present invention relates to conversion tools that are used to convert computer applications and the abstract framework enabling these applications to web applications.

BACKGROUND OF THE INVENTION

The first computers were very hard to use and did not resemble the relatively easy to use personal computer ("PCs") of today. Over time, however, computer systems have become much more "user-friendly" and easy to use, based on a continual rise in the level of abstraction. The following are examples of the evolution of extractions that has taken place.

(1) 1GL->2GL->3GL->4GL Programming Languages

Programming languages evolved through several "generations." At present, there are at least four. The fourth generation programming languages, 4GLs, are various languages, some of which are proprietary. These four generation programming languages include "PowerBuilder" by Sybase, Inc., "RPG" and "PL/1" by IBM, and "ABAP" by SAP, Inc. SQL (Structured-Query Language) is also regarded by many as a 4GL.

(2) Sequential files->Indexed files->Hierarchic Databases->SQL Databases

Over the years, more and more of the details of storing and managing data have been taken over by the computer system. The evolution from sequential filing, which required a great deal of time for the user to find desired information, to SQL database, which provides a rapid method of data retrieval, has provided the mechanism for the movement from the system user directly accessing stored data to the computing system being the actual tool to perform the retrieval with only high-level directions from the system user. Therefore, today it's the system, not the user, that's responsible for locating and retrieving data.

The 4GL programming languages that are mentioned above are meant to be examples of current generation languages but is not all inclusive. However, these 4GL programming languages may be combined through the use of data management systems to develop computer-based applications. In this context, an application, may be the implementation of some type of business function such as "entering an order for a customer," or "deleting an order." In general, applications of this type include four parts or components:

1. Presentation Aspects
2. Database Aspects
3. Specific Business Function Aspects
4. Aspects Specific to Making the Application Available to End Users The "Presentation Aspects" are used to define the end-user interface. For example, they include (i) accepting filled-out forms from the end user, (ii) displaying error messages, or (iii) producing printed output. The "Database Aspects" are generally associated with retrieving and updating database information in response to end-user requests and end-user entries on forms. The "Specific Business Function Aspects," on the other hand, delineate the actual process steps to be performed to implement the business function. Lastly, the "Aspects Specific to Making the Application Available to End Users" are responsible for providing the "Presentation Aspects" to end users regardless of end user location.

Another way to view applications is as a set of logical tiers. A "Presentation Tier" is responsible for the "Presentation Aspects." A "Database Tier" is responsible for carrying out the "Database Aspects." An "Application Tier" is responsible for implementing the "Specific Business Function Aspects." Finally, a "Serving Tier" is responsible for making the "Presentation Tier" available to all users accessing the application.

Most of the applications today are written using the four tiers just mentioned. However, there may be stark differences from application to application as to how these tiers are implemented and how they interact with each other. For example, in a client/server application, a PC communicates with a server computer. Typically, the PC will be running the presentation tier, the servicing tier, and part of the application tier and the serving tier. At the same time, the server computer typically will be running the database tier and another part of the application tier. Client/server applications are sometimes referred to "thick client" applications due to the size of the code that has to be installed on the PC. This and other issues contribute to "thick client" applications being hard to maintain.

On the other hand, typical mainframe, midrange, and iSeries (AS/400) by IBM applications differ from client/server applications. The main difference is that instead of splitting the tier functions between two computers, all four tiers are running on the same computer or server. When this is the situation, the serving tier manages the flow of information between the server and the terminals used by end users to access and uses the application. In the case, of the iSeries, the end user terminals are 5250 terminals or 5250 emulated terminals running on a PC. In most cases, the data that is transmitted between the server and the end user terminal is based on proprietary APIs.

The evolution of the application approach has resulted in what is now referred to as a "web application." There are two main characteristics that distinguish web applications from other applications. The first is that the serving tier is a combination of one or more web servers. Examples of these are the Microsoft "Internet Information Server", IBM "HTTP Server", Sun Microsystems "Apache." The second is that the serving tier sends and receives information (information in this context includes application data and any other data used to present that application data to end users) from web browsers such as Netscape "Navigator" or Microsoft "Internet Explorer." This information includes application data and the data used to present application information to the end users.

As computers became more powerful, they served the role as web browsers and web servers. This increased power also meant they had the capability to handle more complicated tasks. Thus, companies developed more sophisticated web applications that made use of this power. In web application systems where these computers were used, certain activities are defined as "web server side" and "web browser" activities. The following addresses the distinction between these two activity types:

Web Server Side

The development and popularity of web server-side Java applications following the introduction and use of Java programming. The Java language was originally intended for use in small embedded devices. It was first provided as a language for developing elaborate client-side web content in the form of applets. However, as time progressed, Java was being used as a language better suited for server-side development.

Java servlets are an important component of server-side Java development. A servlet is a small, pluggable extension to a server that enhances the server's functionality. Servlets allow developers to extend and customize any Java-enabled server with great degrees of portability, flexibility, and ease of use.

When Java servlets are used to create dynamic content for a web page or extend the functionality of a web server, this, in effect, is creating a web application. A web page in or of itself displays static content that the user can navigate. A web application provides for more substantive interaction with the web page than just this. A web application can be as simple as a keyword search on a document or as complex as an order entry system. Web applications are being deployed for use over the Internet and on corporate intranets and extranets. These web applications have the potential to increase productivity and change the way that companies, large and small do business.

Servlets, such as the Java servlets discussed above, are but one method for developing web applications. The following are other methods by which web applications may be developed:

1. CGI (Common Gateway Interface)
2. Fast CGI
3. Server extension APIs
4. ASP (Active Server Pages)
5. Server-side JavaScript With regard to server extension APIs, there are several companies that have created proprietary server extension APIs for web servers. For example, Netscape provides an internal API that is named "NSAPI" and Microsoft provides one named "ISAPI." These APIs will permit the developer to write server extensions to enhance or change the basic functionality of the server. This in turn will allow the server to handle tasks that were once relegated to external CGI programs.

Web Browsers

Web browsers also have evolved. The first web browsers were only capable of displaying static content. This relegated the end user to navigate the static information by following hyperlinks. These pages were sent from the web server to the web browser via the Hyper-Text Transmission Protocol ("HTTP") and written using the Hyper-Text Mark-up Language (HTML). More specifically, the first web browsers were only able to interpret HTML pages and display them. HTML was only capable of producing static content which is insufficient to create web applications. It became understood that for HTML and the web browser to be able to create web applications, they had to be enhanced.

The enhancements that made web application possible in many cases were on the systems client-side. Client-side in this context is the portion of system where the end user interacts with it to communicate with the server. Some client-side technologies that have facilitated the development of web applications are the following:

1. Dynamic Hyper-Text Mark-up Language ("DHTML")
2. Java Applets
3. ActiveX controls
4. Extensible Mark-up Language ("XML")

DHTML is an extension to HTML. It will allow the developer to create dynamic web pages or pages that can be changed based on end user input. Java Applets are Java programs that run in the context of a Java-enabled web browser. ActiveX controls are programs written in C, C++, VB, Java, or other language that is run in the context of an ActiveX enabled web browser. XML is considered the universal exchange format between the web browser and server. As such, it is widely used. Many web browsers have had their capabilities extended to support XML.

As stated, typically, the web browser and the web server communicate using the Hyper-Text Transmission Protocol ("HTTP"). HTTP is a simple, stateless transmission protocol. A system client, such as a web browser, makes a request which is transmitted using HTTP and the web server responds using HTTP. When the client sends the request, the first thing that is specified is an HTTP command, called a "Method." The "Method" tells the server the type of action it wants performed. This first line of the request also specifies the address of a document (URL) and the version of the HTTP protocol it is using. An example of this follows:

GET/infinium.html HTTP/1.0

According to this example, the request uses the GET method to ask for the document named "infinium.html" using HTTP Version 1.0. After sending the request, the client can send optional information. After the client sends the request, the server processes it and sends back the response.

There is a need for a system and method that will effectively and efficiently handle web applications.

SUMMARY OF THE INVENTION

The present invention is a system and process for the conversion and run-time support of existing applications to true web applications. There are several aspects of the present invention. One is that it defines a system that is the web tier. This web tier replaces the traditional aspects responsible for serving the presentation tier and replaces the proprietary data stream between the client and the server with XML. This will allow for the open integration with other applications. A second is that it defines tools and processes that will generate DHTML pages from existing presentation aspects with minimal or no changes, deployed by the web tier. A third is that the present invention defines tools and processes that convert specific business function aspects with minimal or no changes, enabling them in the web tier. A fourth is that it follows a "thin client" approach by limiting the number of programs downloaded to, and executed in the context of, the web browser. A fifth is that the present invention as capable of preserving access to the databases via the converted specific business function aspects. And sixth, the present invention is capable of preserving access to the application via traditional means.

The system and method may be implemented in an existing mainframe, midrange, and client/server applications which are divided into one or more logical tiers running on one or more computers. These logical tiers include the Presentation tier, Serving tier, Application tier, and Database tier.

In a first embodiment of the present invention, there is communication between the web browser and web servers using DHTML, XML and HTTP. More specifically, XML is used as the universal exchange format between the web browser and the web servers. XML also is used because its architecture permits the integration, collaboration, and customization of dissimilar applications that are part of the same or other web and application servers. DHTML is used for the purpose of presentation at the web browser. This is because DHTML is a language that is very flexible and allows pages that are coded using it to be able to be changed at runtime, even after such pages are loaded into the web browser. As such, the present invention minimizes the need or requirement for the system user to communicate with the web server for updating DHTML coded pages, updating performed at the user's PC or workstation web browser. This means that the system user may readily interact with the content on DHTML pages at the PC or workstation web browser without downloading this content from the web server if it is even possible to download it. HTTP is the communication protocol used below the web browser and web/application server.

The platform that implements the system and method of the present invention may consist of a web browser at the presentation tier, a web server tier, an application server tier, and database server tier. Each tier may be configured with one or more computers/servers that use the same or different operating systems. In systems according to the present invention, the web server and the application server may be combined to form a single apparatus which is referred to as a web/application server. The present invention also will include at least three additional method elements. Specifically, these are three compile-time tools for carrying out the generation process of the present invention. The three tools are application logic, metadata, and presentation logic centric. Specifically, these tools are the "Business Tier tool," "Message Class tool," and "Presentation Tier tool," respectively.

In the implementation of the present invention, the web/application server may include application specific Report Program Generator ("RPG") and Control Language ("CL") programs that are used to control access to the Database Management System ("DBMS") and the system databases. The Business Tier tool converts existing RPG and CL programs so that control is provided for the display of the retrieved information at the web browser, or by convential means. To accomplish this, the Business Tier tool will insert additional code in the existing RPG and CL code that will cause the system to optionally bypass the display files and the workstation manager. The system of the present invention accomplishes this without changing any of the existing RPG or CL code, only adding to it. More specifically, this is done by inserting code in the RPG or CL program that processes and passes application data to and from the web browser through run-time system abstractions, the display object and service object, at the web/application server, and a DHTML/XML Manager at the web browser (rather than using the workstation manager and display files). Although, the manager at the web browser has been referred to as a DHTML/XML manager, it is within the scope of the present invention that may be just a DHTML manager.

The purpose of the display object is to bypass the workstation manager and application display files in the processing of data information. The purpose of the service object is to effect the transfer of data information to and from the web/application server and the web browser. Since the DHTML/XML Manager is at the web browser, the system user will be able to change the DHTML page at the web browser rather than be required to download data from workstation manager and display files if this is at all possible, given that most of the time the code at these locations is proprietary.

The Message Class tool is used to define accessors into the messages that are generated at run-time. These represent the business data stream. According to the preferred embodiment of the present invention, the Message Class tool will generate Java message classes based on the business data which would otherwise be in, and retrieved from, each display file format. The resulting message classes will be used by the service object in parsing to and from a positional data stream and XML message.

The Presentation Tier tool is the third tool. It is employed after the Business Tier tool converts the RPG and CL code. The Presentation Tier tool consumes additional meta data generated by the Business Tier tool and will generate the repository of DHTML pages that are served by the web tier to the browser via HTTP. The Presentaion Tier tool provides the user interface for (i) displaying, entering, changing, and deleting data information, and (ii) displaying system messages within the web browser. The preferred embodiment of this tool uses the display file definitions in generating DHTML pages. These display file definitions are also used by the Message Class tool to generate the message classes. This Presentation Tier tool generates logically one frame and display for each display file, and one page for each format within each display file.

The system that includes these three tools is a true web application because the system activities do not reside in the ability to access and perform actions directly at the web/application server, which in most cases includes proprietary software and is unavailable to the typical system user, but at the PC browser using DHTML and XML that may be used by this same typical user. Thus, the activities are moved from the web/application server to the web browser.

A second embodiment of the present invention has features of the first embodiment; however, it also includes additional elements that will permit an implementation of system and method of the present invention in an open architecture environment. Such a system would include web browsers and a web/application server, and also the Business Tier tool, Message Class tool, and Presentation Tier tool that are substantially the same as the ones described for the first embodiment (with regard to functionality). These three tools are used for converting existing web/application programs that are present in the web/application server to make them true web applications that may be fully interactive at the web browser.

The Business Tier tool of the second embodiment will convert existing RPG and CL programs described above so that such programs may be displayed on the web browser. This will be done, as stated, by inserting the existing code that will cause the bypassing of the workstation and display files managed by the workstation manager and instead use a system that includes the display object, service object, and HTTP server which together form the web tier. The inserted code processes and passes the application data to and from the web browser through a display object and service object at the web/application server, and DHTML/XML Manager at the web browser.

The Message Class tool of the second embodiment, like the one of the first embodiment, is used to define accessors into the messages that are generated at run-time, representing the business data stream. According to the preferring implementation of the second embodiment, the Message Class tool will generate Java message classes based on the business data stream which would otherwise be in, and retrieved from, each display file format. The resulting message classes will be used by the service object in parsing to and from a positional data stream and XML message.

The Presentation Tier tool of the second embodiment, as in the first embodiment, is used after the Business Tier tool converts the RPG and CL code. The Presentation Tier tool consumes additional meta data generated by the Business Tier tool and will generate the repository of DHTML pages that are sent from the web tier to the browser via HTTP. The Presentaion Tier tool provides the user interface for (i)

displaying, entering, changing, and deleting data information, and (ii) displaying system messages within the web browser. Preferably, this tool uses the display file definitions in generating DHTML pages. These display file definitions are also used by the Message Class tool to generate the message classes. This Presentation Tier tool generates logically one frame and display for each display file, and one page for each format within each display file.

The second embodiment also includes two development tools which are used for handling new applications that are added to the system. The structure of the system that implements the system of the second embodiment has a server object which may be in the form of servlets that constitute the interface between the web/application server and the web browser. One development tool connects to the servlets at the client side of the web/application server. This tool permits the web/application server to expand to add new applications to be handled by the system. The second development tool connects to the web/application server in such a way that it will permit the connection of the new application to system databases or function calls to retrieve requested data information. The second development tool, like the first development tool, is configured to provide true web application to the web browser to carry out the operation of the system to which the second embodiment is implemented.

The first and second embodiments of the present invention bring true web application to the systems in which they are implemented. Typically, these will be systems that are capable of using DHTML and XML. The two embodiments permit the system users to display, enter, change, and delete data, and display system messages within the web browser with the only requirement being that the system user be able to write in DHTML and XML. The simplicity of this is that these languages are readily understood by system users and developers, so this does not pose much difficulty. Further, even if a system user is not familiar with DHTML and XML, these are both intuitive and easy to learn. As such, a system user who implements either the first or second embodiments of the present invention does not have to enlist the help of computer programmers who have knowledge of the proprietary web/application server code to be able to effect desired changes to the system including the development and addition of new applications.

An object of the present invention is to provide a system and method that is implemented in open web-based systems, to provide true web application to such systems at the system's web browser level.

Another object of the present invention is to provide a system and method that is implemented in web-based systems and, in a first embodiment of the present invention, provides three conversion tools that are used to effect the true web application at the system's web browser level.

A further object of the present invention is to provide a system and method that is implemented in web-based systems and, in a second embodiment of the present invention, provides three conversion tools, like those in the first embodiment, that are used to effect true web application at the system's web browser level and at least two development tools that are used to effect true web application operation for new applications that are being added to the system for expanding it.

A further object of the present invention is to provide a system and method that is implemented in web-based systems and in the second embodiment providing an open architecture system.

A yet further object of the present invention is to provide a system and method that is implemented in web-based systems that may be according to the first or second embodiment of the present invention that use DHTML and XML for the presentation and transfer of data information between the web browser and the web/application server.

These and other objects of the present invention will be described in greater detail in the remainder of the specification, and in view of the attached figures and the appended set of claims directed to the present invention.

DETAILED DESCRIPTION OF THE DRAWINGS

The present invention is a system and method for converting web application programs so that the system user or developer may perform substantially all activities with respect to the web application at the web browser level, rather than at the web server or application server level, to manipulate and control access to system data information. The present invention includes at least two embodiments. The first embodiment is directed to the conversion of web application programs that currently exist on a system, and the second embodiment of the present invention includes the capabilities of the first embodiment to handle existing web application programs as well as new web application programs that are added to the system. Moreover, the second embodiment may be configured to provide an open architecture system.

Figure 1:
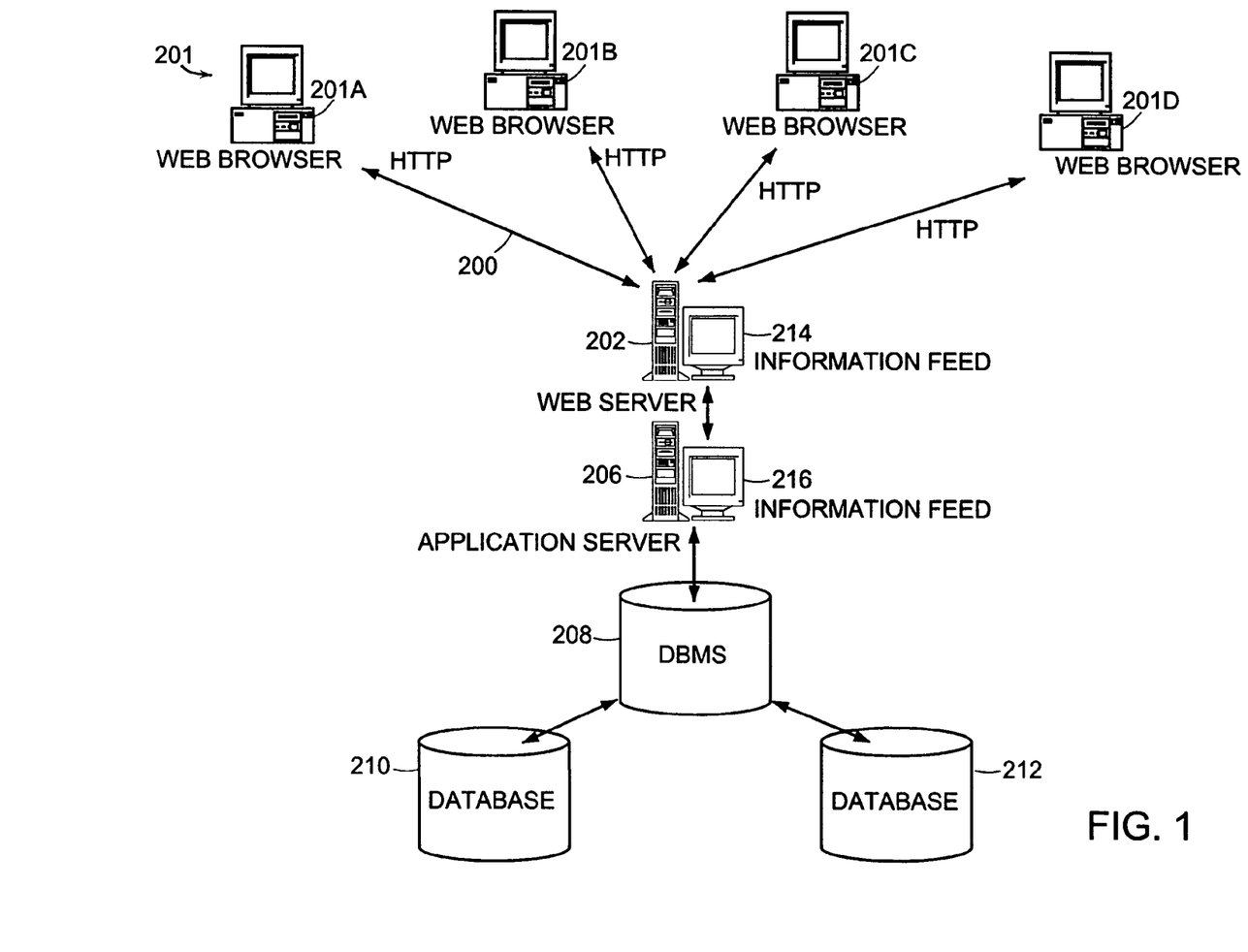
FIG. 1 is a block diagram of a system that may implement the system and method of the present invention.

A web-based system that may implement the system and method of the present invention is shown in FIG. 1 generally at 200. The system will include web browsers of which web browsers 201A–201D are representative. Web browsers 201A–201D may be any conventional personal computer ("PC") or workstation computer and still be within the scope of the present invention. However, pursuant to the present invention, these PCs or workstations will have to have a novel configuration to accommodate the system of the present invention. Preferably, for the web browser, a PC or workstation, hereinafter collectively, "PC," to accommodate the present invention, it must be capable of running Microsoft Windows 95, 98, 2000, NT, XP and beyond, and Internet browser software, such as Microsoft Internet Explorer or Netscape Navigator. According to the present invention, the PC will be the system client that provides the platform for the system user to be able to interact with the web application programs that reside at the web/application server 202/206. This results in true web/application at the browsers. As the system client, the PC will be used to request services from web/application server 202/206 using the HTTP and will accept responses from the web/application server also using HTTP.

Web server 202 connects to application server 206 to form web/application server 202/206. Application server 206 may be one of various types. One of which is a structured-query language ("SQL") server. The application server is used to access the one or more system databases. Application server 206 may be associated with specific system databases, such as databases 210 and 212, through DBMS 208. DBMS 208 may include the database applications that also may have a relational data structure. As such, system databases 210 and 212 may be relational databases, and, therefore, may be structured to store data information which may be retrieved according to relational database rules.

Shown at 214 and 216 in FIG. 1 are independent information feeds. Feed 214 connects to web server 202 and feed 216 connects to application server 206. These can provide information from a variety of sources that are fed directly to the system. The information may be automatically added or added by some type of user-controlled method. As an example, the feed information may be streaming data that is being fed to the system. This streaming data could be things such as stock prices, the weather, sports scores, or other types of information that is subject to frequent changes. The information feed also may be scheduled updates for database information or cause the removal of information from the system databases in a synchronous or asynchronous manner.

As stated, web browsers 201 connect to web/application server 202/206 via respective HTTP connections. The web browsers are in an XML environment. Preferably, XML is the universal exchange format that is used between the web browsers and the web server. XML is desirable because it is conducive to the integration, linking, and customizing the server applications that are part of the web/applications server.

DHTML is a very flexible language that will allow pages coded by this standard to be changed even after they are loaded into the web browser. As such, it provides very desirable attributes for the present invention. Accordingly, there is no longer the requirement for web browsers to communicate with the web/application server for updating pages coded by DHTML since this may be done at the web browser. The result of this is that the system user can update and make changes to the content on DHTML pages without downloading any content from the web/application server. This also will enable true web/application at the web browser as opposed to performing these same functions at the web/application server level as has been the case in the past.

Before the configuration of the system of the present invention is discussed in any greater detail, there will be a more detailed discussion of the configuration of the web browser and web/application server that will implement the present invention.

Figure 2:
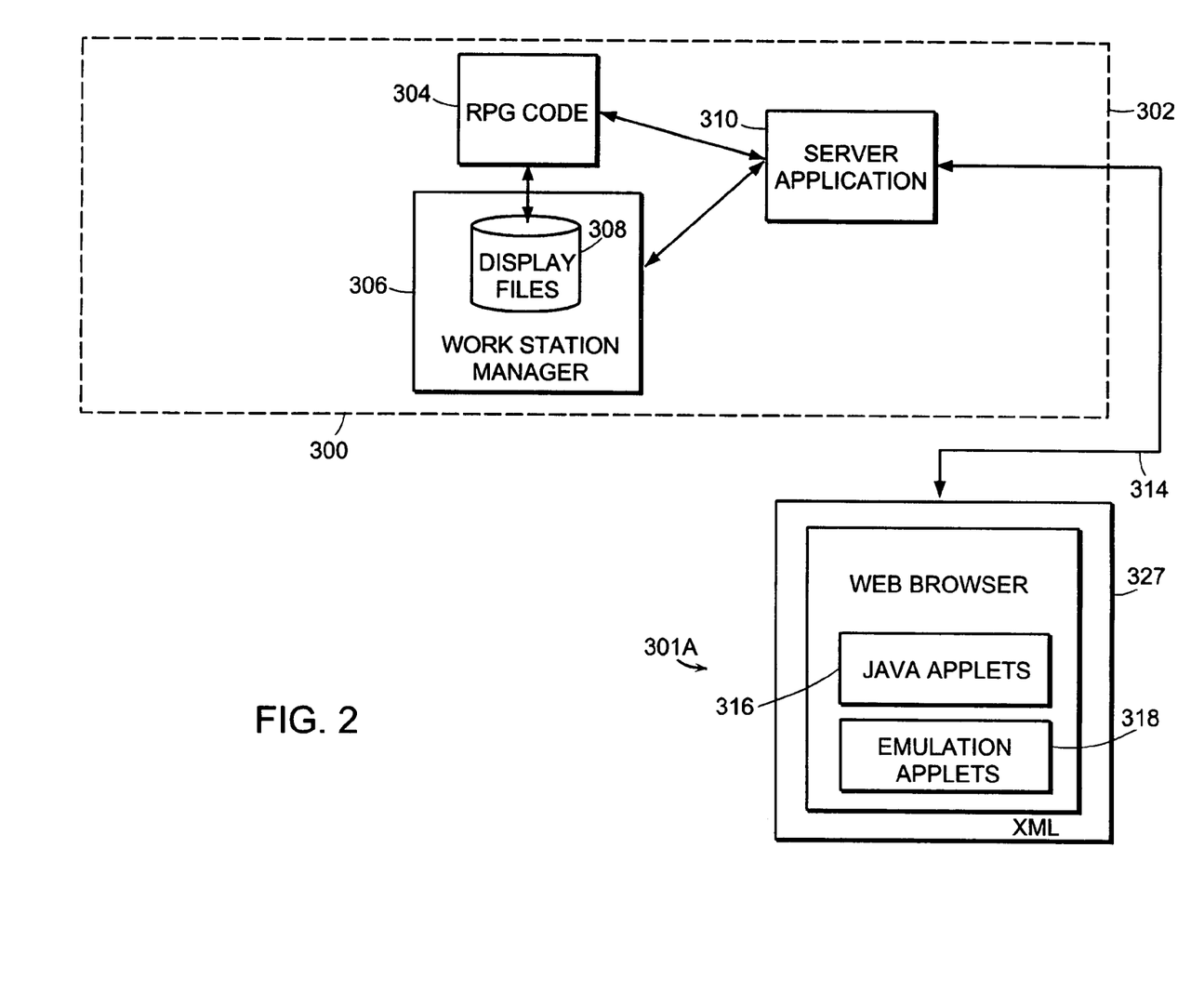
FIG. 2 is a block diagram of the more detailed view as a system that may implement the system and method of the present invention that may be used for web applications.

Referring to FIG. 2, generally at 300, a portion of a system is shown that will implement the present system and method of the present invention. The configuration of a web/application server is shown at 302 and a client in the form of a web browser is shown at 301A. Web browser 301A, which exists in XML environment 327, connects to web/application server 302 via line 314. This web browser and web/application may be associated with a LAN, MAN, and WAN, and networked as an intranet or through the Internet. The connection may be a wireless connection or could be a combination of hardwire and wireless connections. Moreover, this connection may be supported by a variety of protocols and languages and still be within the scope of the present invention although HTTP, DHTML and XML are preferred. The configuration that is shown in FIG. 2 does not show the DBMS or system databases that connect to the web/application servers as shown in FIG. 1. However, it is understood that these system elements would be present if the entire system was shown. Therefore, the portion of FIG. 1 that shows DBMS 208 and system database 210 and 212 is incorporated here by reference.

The purpose of the web/application server is to make requested data information available to the system user through the web browser. In the configuration that is shown in FIG. 2, it is understood that implementation of the first or second embodiment of the present invention will result in the web browser and web/application server providing system users with the services for accessing the DBMS and system databases in novel ways. Some of the data information that is made available also will cause the web/application server to perform specific acts, such as cause a purchase to be transacted.

The web applications that are contemplated for use with the present invention include public applications, enterprise applications, group applications, personal application, and embedded applications. Public applications include large numbers of the general public as system subscribers that are provided services by the system. Enterprise applications are directed to intranet sites that operate within an organization. Group applications are systems that service a specific work group, such as an office. Personal applications are used by a single system user and embedded applications use a particular device that connects to a network, such as a printer.

Again referring to FIG. 2, the portion of the system that is shown illustrates the components of the implementing system. In this Figure, a representative web browser is shown at 301A. Besides web browser 301A existing in an XML environment, it may contain Java applets 316 and emulation applets 319. Java applets 316 are used for Java-based communications between web browser 301A and web/application server 302. Emulation applets 318 are configured in software to run on the PC for controlling the presentation and display of data information that is retrieved from the system databases shown, for example, in FIG. 1. The emulation applets, however, do not use the computing power of the PC because all of the logic and data for these applets come from the web/application server 302.

In the configuration that is shown in FIG. 2, web/application server 302 may be a Java-based server that is part of a multi-tier, e-business environment. In such a system, the middle tier includes a HTTP server that handles requests from web browser 301A. The HTTP server is preferably part of server application 310 that is on the client side of web/application server 302.

The business tier of the multi-tier structure includes the business logic and business databases that may include RPG code 304. In the context of the business tier, the middle tier provides the linkage between the HTTP requests from web browser 301A, and the business logic and databases of the business tier.

Another tier is the presentation tier that resides at the web browser. This tier will effect the display of data information for the system user and provide the interface platform for the system user to interact with the system to request and update data information and observe the results of such requests.

In the configuration of FIG. 2, the web/application server provides the environment for running web-enabled web applications. In particular, the web applications are dependent on the processing power and response time of the web/application server. In such a configuration, the PC, which acts as the presentation tier, serves only as the presentation device. This is generally carried out through the emulation software running on the PC. As would be readily understood, the use of a PC for the sole purpose of presentation uses only a fractional amount of its processing capability. Therefore, it is desirable to provide as much of the processing of the web/application at the web browser rather than the web/application server, thereby using more of the processing power of the PC.

There have been situations in the past in which there have been distributed logic that provided for the PC to run a PC application software instead of emulation software. In such configurations, the PC processing power was utilized to perform some of the web/application processing. Such configurations also had communications between the web browser and the web/application server to request and retrieve data information; however, in this context, the system that employs the distributed logic was configured so that the PC would perform some of the processing and use some local data information but it still primarily relied on the web/application server for most of the processing activity, therefore, not providing true web application at the web browser.

Referring again to FIG. 2, Java applets 316 that are running in web browser 301A cause the system to operate in a manner similar to the distributed logic configuration that was discussed above. The Java applets push certain operations or actions from the web browser to the PC. This results in the use of some of the processing power of the PC outside of those used to sustain the web browser functions. The Java applets function to effect communications between web browser 301A and web/application server 302 so that the web browser may access and/or update data information in the system databases. Since the Java applets are used, web applications preferably are written to use them at the web browser, but still there was no true web application at the web browser.

According to the first embodiment of the present invention, when the three conversion tools are implemented, the middle tier of the system shown in FIG. 2 is contained within web/application server 302. This middle tier will include Java servlets as part of server application 310. The Java servlets are accessed when requests are sent form the web browser 301A via Java applets 316. Therefore, when a client request results in a specific Java servlet to be used, it will be loaded into the server application memory to handle the client request. The requested Java servlet will then process the client request using RPG code 304. Data information is retrieved from the system databases using the DBMS as controlled by web/application server 302 and/or RPG code 304. The retrieved data will be described as defined by the display files or other server based meta data and sent from server application 310 to web browser 301A in the form of an XML document. The information may then be translated and displayed on the display screen of web browser 301A.

Figure 3:
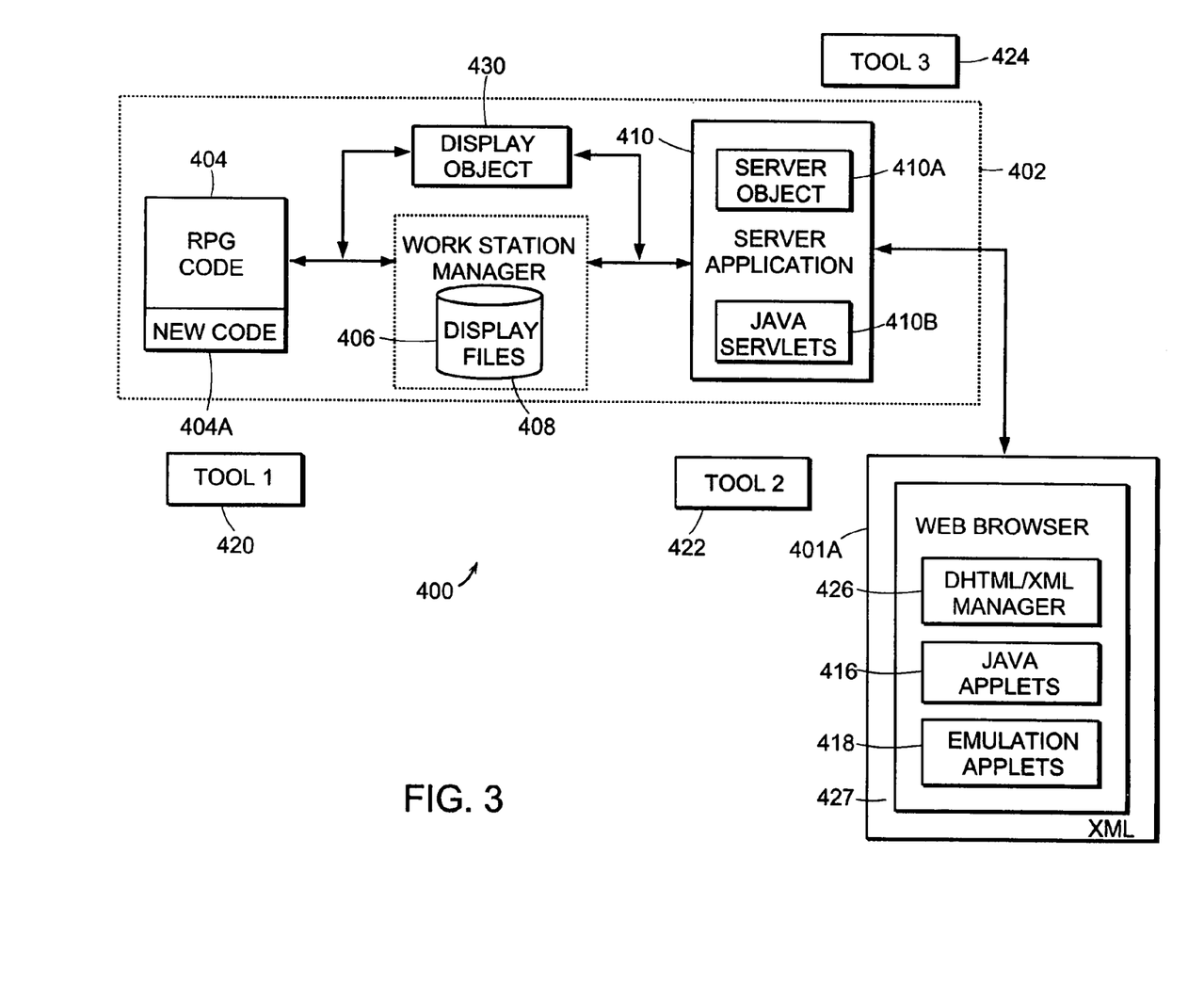
FIG. 3 is a block diagram of a first embodiment of the novel software that may be used to implement the system and method of the present invention.

FIG. 3, generally at 400, shows a first embodiment of a system that implements the system and method of the present invention for converting web application programs. In the system shown in this Figure, a representative web browser is shown at 401A. This web browser is representative of any of a number of web browsers that may be used by system users to interface with the system. Web browser 401A may include emulation applets 418 and Java applets 416. Emulation applets 418 operate similar to emulation applets 318 in FIG. 2 and Java applets 416 operate similar to Java applets 316 in that figure. As such, the description of these elements of the web browser that were described with regard to FIG. 2 apply equally to FIG. 3 and are incorporated by reference.

Web browser 416, different from web browser 316, includes DHTML/XML manager 426. This element will receive the XML-formatted data information retrieved from the system databases that is to be displayed at the web browser. The DHTML/XML manager will decode the data information received from the web/application server and apply the appropriate display information for displaying the data information on the display screen of web browser 401A.

As shown, web browser 401A is in an XML environment. The XML environment is used for effecting the transfer of information between web browser 401A and web/application server 402 in a conventional manner.

Also shown in FIG. 3 is web/application server 402. Web/application server 402 connects to a DBMS and the system databases which are not shown in FIG. 3. However, FIG. 1 provides a representative configuration of the manner in which the web/application server connects to the DBMS and system databases that applies equally to web/application server 402 in FIG. 3.

Web browser 402 includes server application server 410, workstation manager 406 with display files 408, and RPG code 404. These elements are substantially the same as server application 310, workstation manager 306 with display files 308 and RPG code 304; therefore, the descriptions of server application 310, workstation manger 306 with display files 308, and RPG code 304 apply equally to FIG. 4 and are incorporated by reference.

Server application 410, workstation manager 406, and RPG code 404 of web/application server 402 each show additional elements beyond what was shown in FIG. 2. Further, web/application server 402 includes the conversion tools and display object 430 that implement the present invention. The conversion tools are shown connecting to web/application server 402, display object 430, and the additional elements shown in server application 410, and together they effect the novel aspects of the present invention that will provide true web application at web browser 401A.

Before discussing the conversion that will take place, the additional elements that are shown in server application will be discussed. The elements are server object 410A and other Java servlets 410B. These elements are typically in server applications but are not necessarily used in the way they implement the present invention.

Server application 410 includes server object 410A and other Java servlets 410B. Server object 410A is used on the client side of the web/application server for communications between the web/application server and web browser 402 that is in XML environment 427. Server object 410A, itself a Java servlet, receives requests from web browser 401A, retrieves and processes the data information from the RPG and/or system databases and returns the requested data information to the requester (system user).

Figure 4:
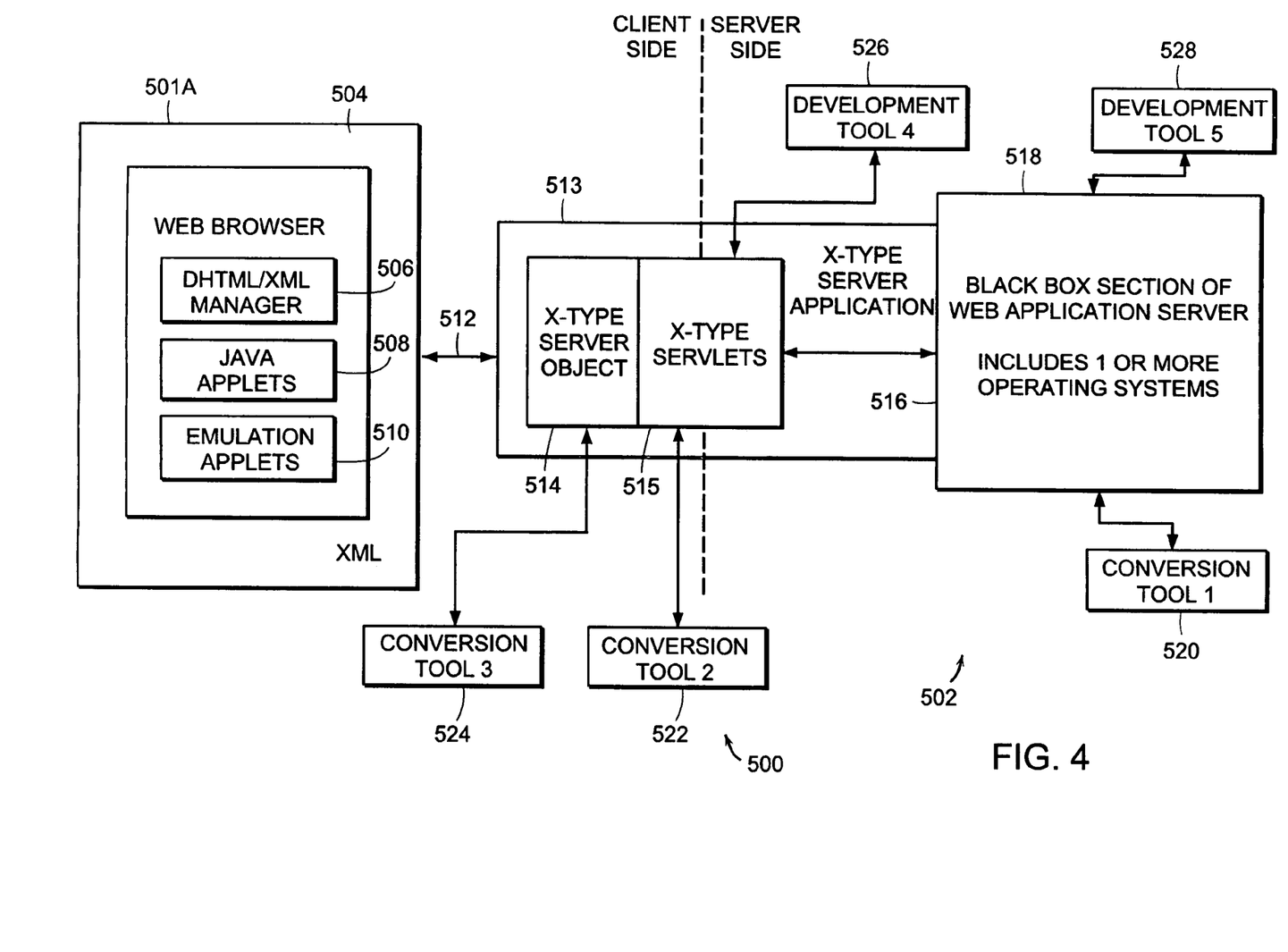
FIG. 4 is a block diagram of a second embodiment of the novel software that may be used to implement the system and method of the present invention.

The other elements shown in FIG. 4 that are not one of the three conversion tools are Display object 430 and new RPG code 404A. Both of these elements are associated with the operations of the system and method of the present invention as will be explained in detail subsequently.

The conversion that takes place is effected through the use of the three tools that have been previously described. These tools permit the implementing system to be able to have true web application at the web browser, not at the web/application server. This will permit extensive activities to be performed by the web browser which is advantageous in lessening the need for programmers with specific knowledge of the proprietary code of the web/application server to access, edit, and operate web applications.

The novel system at 400 of FIG. 3 includes web browser 401A, web/application server 402, and three tools. These tools are Tool 1, which is the Business Tier tool 420, Tool 2, which is Message Class tool 422, and Tool 3, which is Presentation Tier tool 424. The Business Tier tool 420 connects to RPG code 404; the Message Class tool 422 connects to display files 408; and Presentation Tier tool 424 connects to display files 408 and other business tier meta data. Each of these tools will now be discussed.

As stated, Business Tier tool connects to RPG code 404. The Business Tier tool converts the existing RPG and CL programs to enable them to cause the display of information on web browser 401A without using workstation manager 406 and display files 408. In performing this function, Tool 1 at 420 will concatenate new code 404A to the existing RPG code 404. This new code will cause the system to bypass display files 408 that are associated with workstation manager 406 and pass the application data to and from web browser 401A through display object 430, server object 410A of server application 410, and DHTML/XML manager 426 at web browser 401A.

Tool 1 at 420 is for converting existing RPG and CL programs that normally use display files 408. However, if an existing system file does not use display files 408, it will not be converted in any way and these files will execute in the normal manner. That is, existing files that do not use display files 408 will not have new code 404A concatenated to them but they will process the web application normally through the web/application server 402 and not use display object 430.

Existing web/application programs that use display files 408 will have Tool 1 at 420 convert the RPG and CL programs by concatenating the new code at 404A to it. This new code is compiled with the original RPG code. The purpose of the new code is to cause the RPG code to bypass display files 408 and to look to display object 430 instead. Each web application program that is converted preferably receives substantially the same code at 404A. However, it is understood that each program may receive a different code and still be within the scope of the present invention.

With respect to a particular RPG program, the code that Tool 1 at 420 may insert at 404A will perform a number of functions. One function is that the new code at 404A will insert data elements that may be used for manipulating the data that would have been returned to the display screen at web browser 401A. Another function is that it will insert function calls to subroutines that will process the READ and WRITE code for converting them to a new screen format from the old screen format. This is necessary since the original READ and WRITE code that was to be used with display files 408 has been bypassed. A third is that Tool 1 will construct an appropriate number of subroutines which will assemble a buffer of data information that will be sent to web browser so that the display screen will now be directed to the DHTML/XML manager at the web browser for obtaining the data information to be displayed. Preferably, the subroutines that are constructed will be for reading and writing. According to these subroutines, the WRITE operation will result in display object 430 assembling the buffer data and the READ operation will result in the display object disassembling the buffer data. The new code is normally used in situations in which the system user is running the web application through a web browser, such as at web browser 401A and not web/application server 402.

Preferably, the message classes being used in the system and method of the present invention are Java message classes that will define the implementation of a particular type of object. Such a class definition will define the instance and class variables, and methods. It will also indicate the interfaces which the class implements. Accordingly, objects that share the same description will belong to the same class and fall under a particular class definition.

According to the present invention, Tool 2 will create message classes that represent the definition of the display file format data from display files 408. These message classes will be used in lieu of what would have been provided for display files 408 since the display files in workstation manager 406 are being bypassed.

It is understood that the preferred embodiment of the present invention uses Java message classes in its implementation; however, it is contemplated that the scope of the present invention will also include other methods that may or may not use specific message definitions such as the Java message class referred to above.

As stated, the purpose of display object 430 is to replace workstation manager 406 in the path for processing the requests that use RPG code 404 under circumstances when a particular web application program would ordinarily use display files 408. As such, the display object 430 becomes the conduit through which application data is passed to web browser 401A for display. In carrying out its functions, display object 430 will cache subfile data that is used by certain RPG programs.

Tool 2 at 422 is the Message Class tool that connects to display files 408. Preferably, this Tool is a Java-based Message Class tool. Tool 2 may be launched by Tool 1 at 420, the Business Tier tool. Tool 2 at 422 connects to display files 408 associated with workstation manager 402 to obtain definition information for the Message Classes. Tool 2 will operate to determine the Java message classes that will be the definition of the display file format data from display files 408. This may include SET, GET, and convenience methods. Tool 2 is used to create Java classes the first time Tool 1 at 420 is used to create the RPG and CL code. Tool 2 is also used wherever there is a change of the display file definitions in the display files 408 so that the appended code will indicate the proper class. Tool 2 is compiled with the rest of the code.

Tool 3 at 424 is the Presentation Tier tool which connects to display files 408 and other business tier meta data. This tool is used to generate the DHTML pages that are transmitted from the web/application server 402 to web browser 401A. The DHTML pages that are generated provide the system user with an interface for displaying, entering, changing, and deleting data information at web browser 401A. Tool 3 is executed after and independantly of the other tools.

Preferably, Tool 3 is used once new code 404A has been generated by Tool 1 at 420 and concatenated to RPG code 404, and Java message classes have been generated by Tool 2 at 422. Tool 3, the Presentation Tier tool, uses the display file definition from display files 408 to generate one page for each display file, and one page for each record format that exists within each display file. According to the present invention, Tool 3 preferably will name the display files and record formats as follows:

| | |
|---|---|
| Display Files | = displayfilename.html, displayfilename_frame.html |
| Record Formats | = displayfilename_recordformatname.html |

The files that are generated and named according to the convention just described must have a location where they may be stored upon transmission to the web browser in response to a data information request. Accordingly, the system user creates appropriate file folders for that purpose at the PC that serves as the web server. Therefore, as the DHTML pages are generated by Tool 3 at 424, they will be stored for display in these file folders.

In general, to use Tool 3, the Presentation Tier tool at 424, the system user must first establish a connection between web browser 401A and web/application server 402. The connection that is established will also identify a knowledgebase database to be used by the system user. This database will contain any of the changes that the system user creates for the system in the course of his/her use.

Once the DHTML pages are generated, they will be stored for access by the web/application server, consistent with the file folders discussion above. After this is done, the system user may retrieve these pages from the screen folders when desired.

DHTML/XML manager 426 at web browser 401A exists in an XML environment. Tool 3 at 424, will generate the DHTML pages that are sent to the presentation tier at web browser 401A. The generated pages are processed by the DHTML/XML manager 426 to produce DHTML pages. Since the DHTML/XML manager and DHTML pages are in an XML environment, the system will provide the system user access to the system so that DHTML pages may be changed after they are loaded in the web browser without communication to the web/application server. Moreover, the DHTML pages that are presented through the DHTML/XML manager according to the present invention permit the system user to interact with the content of these pages without the need to download any additional content from the web/application server. As such, the DHTML pages can respond immediately to the system user's actions relating to content.

The XML environment also gives the system user the ability to interact with the web application programs without knowledge of the proprietary code used for these programs. As such, if the system user has knowledge of XML, he or she may integrate, link, and customize web application as desired.

The second embodiment of the present invention is shown generally at 500 in FIG. 4. The second embodiment of the system and method of the present invention is an open architecture system that may be adapted for a standard set of interfaces for connection to a web/application server and web browser. The system and method of the second embodiment of the present invention will now be described with reference to FIG. 4.

Referring to FIG. 4 at 500, two elements of the system that implement the system and method of the present invention are shown. These elements are web browser 501A, which is representative of a plurality of web browsers that are used by system users and web/application server 502. Although it is not shown in FIG. 4, it is understood that the web/application server connects to DBMS and system databases in a manner similar to what is shown in FIG. 1. Therefore, this aspect of FIG. 1 is incorporated by reference in FIG. 4.

Referring first to web browser 501A, its configuration is substantially similar to the configuration of web browser 401A in FIG. 3. Web browser 501A is in XML environment 504 for the purposes of communications with web/application server 502. Web browser 501A may include Java applets 508 and emulation applets 510. The purposes of these two elements of the web browser 501A are substantially the same as they are for the first embodiment of the system implementing the present invention that is shown in FIG. 3 and those descriptions are incorporated by reference here.

The remaining element of web browser 501A is DHTML/XML manager 506. The DHTML/XML manager is for processing the web pages that are received from web/application server 502. The DHTML pages that are received will be displayed on the display screen of the web browser. The description of the operation of the DHTML/X manager that was set forth above with respect to DHTML/XML manager 426 in web browser 401A in FIG. 3 applies equally to DHTML/XML manager 506 in web browser 501A in FIG. 4; therefore, such descriptions of the operation of DHTML/XML manager are incorporated here by reference.

Web browser 501A communicates with web/application server 502 over connection 512. Connection 512 may be a hardwire connection, a wireless connection or a combination of both. Moreover, the connection may be associated with a LAN, MAN or WAN that is part of an intranet, or uses the Internet. The transmission over connection 512 to web/application server 502 uses HTTP. An XML environment is used for the connection between the web browser 501A and the web server 502. DHTML is language that is used for coding the pages that will be displayed on the display screen of the web browser. In view of the use of XML as the environment of web browser 501A, the system user may readily change the DHTML pages after such pages are loaded into the browser. To make changes, all that is necessary is that system users know XML and DHTML rather than proprietary code that is traditionally used for coding the web/application server. Further, there is no requirement for web browser 501A to communicate with web/application server 502 for updating pages coded by DHTML since this may be done at web browser 501 A. The result of this is that the system user can update and make changes to the content on DHTML pages without downloading any content from web/application server 502. This will enable true web application at web browser 501A as opposed to performing these same functions at web/application server 502.

The HTTP connection at 512 connects to X-type server application 513. This is an X-type server application to indicate that it has a generic interface according to a standard for the connection of the elements of the present invention. Accordingly, when the system of the present invention is implemented with such an X-type server application, the server application will respond appropriately to the operation of the system elements regardless of the internal configuration of the X-type server application, given the standard interface for connecting to the X-type server application.

X-type server application 513 includes X-type server object 514 and X-type servlets 515. X-type server object 514 is on the client side of X-type server application 513 and will be used to effect communications between X-type server application 513 and web browser 501A. X-type servlets 515 that are present in X-type server application 513 have a portion on the client side of the X-type server application that is associated with X-type server object 514 which communicates with web browser 501A. The other portion of X-type servlets 515 is associated with the server side and communicates with the black box section 516 of web/application server 502. It is to be noted that black box 516 may include one or more operating systems ("OSS"). Further, it is understood that it may receive information feeds as shown in FIG. 1.

In the first embodiment of the present invention the servlets in the server application were described as Java servlets. However, in the second embodiment they are described as X-type servlets. Therefore, they may be according to another language such as C++ and still be within the scope of the present invention.

As shown in FIG. 4, there are three conversion tools connected to web server 502. These are conversion tool 1 at 520 that connects to black box section 516 of web/application server 502, conversion tool 2 at 522 that connects to X-type servlets 515, and conversion tool 3 at 524 that connects to X-type server object 514. As is shown, the latter two conversion tools are connected to the X-type server application. These tools, like Tool 1, are adopted to an open architecture for connections to standard interfaces.

The three conversion tools, conversion tool 1 at 520, conversion tool 2 at 522, and conversion tool 3 at 524, are meant to perform substantially the same functions as are performed by the Business Tier tool 420, Message Class tool 422, and Presentation Tier tool 424 as shown in FIG. 3. As such, these tools will convert existing web application programs so that there is true web application at web browser 501 A. More specifically, conversion tool 1 at 520 will convert the RPG or other similar functioning code that is used by web/application server 502 to cause the by passing of the structure that contains the display files and controls access to the DBMS and the system databases. Conversion tool 2 at 522 will determine the message classes that are to be used if the system uses a hierarchical language, such as Java, that was used in the first embodiment of the present invention. However, if the language in not a hierarchical language, such as Java, then conversion tool 2 at 522 will remain idle and not be used for that particular implementation scheme. Conversion tool 3 at 524 will be used for generating the DHTML pages that are sent to the web browser.

It is understood that a system user or software developer may desire to develop new web applications and add them to the system. In doing so, it is inefficient to develop such new web applications in the old manner that will at some time require conversion as described in the first embodiment using conversion tools 1, 2, and 3. Accordingly, the second embodiment includes development tool 4 at 526 and development tool 5 at 528. These tools are to accommodate the development of new web applications that will provide true web application at web browser 501A.

According to this aspect of the second embodiment of the present invention, if there is a new web application to be added, it may be created in XML and then input to the system. The web application will be loaded at X-type server application 513 on the server side. Since this is a new web application, it must establish connections to a DBMS and databases from which it may effect retrieval of data information. A method to do this is to use development tools 4 and 5 at 526 and 528, respectively.

The second embodiment of the present invention carries out the above operation by loading the new web application code to the development tool 4 at 526. Therefore, when this new application is requested by the system user, the system implementing the present invention will not follow the path which is used for existing web application programs, but will follow a new path that will access web application code at development tool 4 at 546 and code for accessing appropriate databases at development tool 5 at 528. Development tool 5 will cause the new web application to access databases that may be different from the system databases discussed with respect to the existing web applications. That is, these databases will be different from system databases 110 and 112 that were described previously. Development tool 5 at 528 may also access a function call that would direct the query to another location where the data information at issue is located. Once it is located, this data information is retrieved or updated and then the data information is returned or an acknowledgment of updating is returned to development tool 5. After this, it is appropriately processed by development tool 4, the servlets and passed to web browser 501A as a DHTML page in XML. From this point, the DHTML page is processed in the same manner as was described for the first embodiment.

Development tools 4 and 5 at 526 and 528, respectively, are integrated into the system that employs the present invention on the server side of web/application server 502. The code that is written for the new web applications that reside at development tools 4 and 5 may be any type of code that will permit the desired activities to take place. For example, it may be Java, RPG, or other code. This code may be written by a programmer or other entity in XML and translated by an appropriate interface at the X-type servlets and input to development tools 4 and 5. All that is necessary, however, is development tool 5 at 528 be compatible with the code at development tool 4 at 526.

The second embodiment of the present invention brings true web application to the web browser. The second embodiment requires the system user to know XML and DHTML for effecting changes like the first embodiment. This will provide a relatively easy method for the system user to effect change to his or her programs without being an "extreme programmer" with knowledge of the proprietary code in the black box that accommodates the existing code.

The terms and expressions that are employed herein are terms of description and not of limitation. There is no intention in the use of such terms and expressions of excluding the equivalents of the feature shown or described, or portions thereof, it being recognized that various modifications are possible within the scope of the invention as claimed.

The invention claimed is:

1. A web-based computer system for enabling web applications at a system client, comprising:
    a system client that enables a system user to interact with the web-based computer system, with the system client at least comprising,
    client manager for controlling processing for manipulating and displaying data information received from a central server, and providing means for manipulating content of web applications at the system client,
    a display for displaying data information from the central server and providing an interface to web applications,
    client controls for providing the system user with an interface for interacting with web applications to request data information from storage of the web-based computer system based on an intent and a purpose of the web applications, to cause the display of the data information that is received by the client manager from the central server, to manipulate data information received from the central server, and to manipulate content of web applications;
    a communications link for connecting the system client to the central server;
    the central server that connects to the system client for at least processing requests for data information stored in storage of the web-based computer system processing data information retrieved based on requests, and transmitting retrieved data information to the system client, with the central server at least comprising, a server application that receives requests for data information from the system client and transmits responses of requests to the system client, display files for providing display definitions for use in converting web applications so that such converted web applications are enabling at the system client, central server code for controlling the retrieval of data information stored in the storage of the web-based computer system, a display object for effecting communications between the central server code and the server application, the storage of the web-based computer system for storing data information that is capable of being retrieved based on requests sent from the system client;

a first conversion tool that connects to the central server code for adding code to the central system code, with the added code for controlling the transmission path of data information through the central server to include the display object and by-pass the display files;

a second conversion tool that connects to the server application and receives an input from the display files, with the second conversion tool for assigning a classification to the data information being transmitted from the central server to the system client according to a predetermined classification scheme based on the display definitions input from the display files; and a third conversion tool that connects to the server application and receives an input from the display files, with the third conversion tool for the formatting responses that are being transmitted from the central server to the system client according to a predetermined format with the format being such that the content of web applications may be manipulated by the client controls at the system client.

2. The system as recited in claim 1, wherein the system client includes a web browser.

3. The system as recited in claim 2, wherein the web browser includes a personal computer or computer workstation.

4. The system as recited in claim 1, wherein the client manager includes a dynamic hyper-text mark-up language ("DHTML") manager.

5. The system as recited in claim 4, wherein the third conversion tool formats responses in a DHTML format for input to the DHTML manager at the system client.

6. The system as recited in claim 1, wherein the system client is formed within an extensible mark-up language ("XML") environment for communications to and from the central server.

7. The system as recited in claim 1, wherein the communications link between the system client and the central server is according to a predetermined protocol.

8. The system as recited in claim 5, wherein the protocol for the communications link includes hyper-text transmission protocol ("HTTP").

9. The system as recited in claim 8, wherein the client controls have input means for the system user to interact with web applications to request data information based on an intent and a purpose of web applications, to cause the display of the data information that is received from the central server, and to manipulate data information received from the central server, and to manipulate content of web applications.

10. The system as recited in claim 1, wherein the server application includes a server object to which the third conversion tool connects.

11. The system as recited in claim 10, wherein the server application includes servlets to which the second conversion tool connects.

12. The system as recited in claim 1, wherein the display object includes a buffer.

13. The system as recited in claim 12, wherein the display object assembles the buffer for data information that is to be sent to the system client.

14. The system as recited in claim 13, wherein the display object disassembles the buffer for data information that is to be sent to the central system code.

15. The system as recited in claim 1, wherein the central server code includes RPG code.

16. The system as recited in claim 15, wherein the first conversion tool concatenates code to existing RPG code.

17. The system as recited in claim 16, wherein the first conversion tool concatenates RPG code to existing RPG code.

18. The system as recited in claim 1, wherein the system converts web applications that exist on the system that would have used the display files if such display file were not bypassed.

19. A three tier web-based computer system for enabling web applications at a presentation tier, comprising:

the presentation tier for controlling display of data information formatted according to a predetermined format received from a middle tier, and for at least manipulating content of web applications;

a communications link for connecting the presentation and middle tiers;

the middle tier for processing requests from the presentation tier for data information stored in storage of the web-based computer system, transmitting data information formatted according to a predetermined format to the presentation tier;

a business tier for processing requests received from the middle tier and controlling the retrieval of data information from storage of the web-based computer system based on the requests;

the storage of the web-based computer system for storing data information that is capable of being retrieved based on requests sent from the presentation tier;

a first conversion tool that connects to the business tier for adding code to business tier code, with the added code for controlling the transmission path of data information through the business tier to include a display object and by-pass display files;

a second conversion tool that connects to the middle tier and receives an input from the bypassed display files in the business tier, with the second conversion tool for assigning a classification to the data information being transmitted from the middle tier to the presentation tier according to a predetermined classification scheme based on the display definitions input from the display files; and a third conversion tool that connects to the middle tier and receives an input from the display files, with the third conversion tool for the formatting responses that are being transmitted to the presentation tier according to the predetermined format with the format being such that the content of the web application may be manipulated at the presentation tier.

20. The system as recited in claim 19, wherein the presentation tier includes a web browser.

21. The system as recited in claim 20, wherein the web browser includes a personal computer or computer workstation.

22. The system as recited in claim 19, wherein the presentation tier includes a dynamic hyper-text mark-up language ("DHTML") manager.

23. The system as recited in claim 22, wherein the presentation tier is formed within an extensible mark-up language ("XML") environment for communications to and from the middle tier.

24. The system as recited in claim 22, wherein the third conversion tool formats responses in a DHTML format for input to the DHTML manager at the presentation tier.

25. The system as recited in claim 19, wherein the communications link between the presentation tier and the middle tier is according to a predetermined protocol.

26. The system as recited in claim 25, wherein the protocol for the communications link includes hyper-text transmission protocol ("HTTP").

27. The system as recited in claim 26, wherein the presentation tier has input means for a system user to interact with web applications to request data information based on an intent and a purpose of web applications, to cause the display of the data information that is received from the middle tier, to manipulate data information received from the middle tier including of at least the manipulation of content of web applications.

28. The system as recited in claim 19, wherein the business tier code includes RPG code.

29. The system as recited in claim 28, wherein the first conversion tool concatenates code to existing RPG code.

30. The system as recited in claim 29, wherein the first conversion tool concatenates RPG code to existing RPG code.

31. The system as recited in claim 19, wherein the system converts web applications that exist on the system that use the display files if such display file were not by-passed.

32. An open architecture, web-based computer system for enabling web applications at a system client, comprising:
   a system client that enables a system user to interact with the web-based computer system, with the system client at least comprising,
   client manager for controlling processing for manipulating and displaying data information received from a central server, and providing means for manipulating content of web applications at the system client,
   a display for displaying data information from the central server and providing an interface to web applications for the system user,
   client controls for providing the system user with an interface for interacting with web applications to request data information from storage of the web-based computer system based on an intent and a purpose of the web applications, to cause the display of the data information that is received by the client manager from the central server, and to manipulate data information received from the central server that includes at least manipulation of content of web applications;
   a communications link for connecting the system client to the central server;
   the central server that connects to the system client for at least processing requests for data information stored in storage of the web-based computer system, processing data information retrieved from a first storage element of the we-based computer system based on requests, and transmitting retrieved data information to the client system, with the central server having central server code that controls the retrieval of data information stored in the first storage element,
   the first storage element for storing data information that is capable of being retrieved based on requests sent from the system client;
   a second storage element of the web-based computer system for storing data information that is capable of being retrieved based on requests sent from the system client;
   a first open architecture interface that connects to a first location of the central server;
   a second open architecture interface that connects to a second location of the central server;
   a third open architecture interface that connects to a third location of the central server;
   a fourth open architecture interface that connects to a fourth location of the central server;
   a fifth open architecture interface that connects to a fifth location of the central server;
   a first conversion tool that connects to the first open architecture interface for adding code to central server code, with the added code for controlling the transmission path of data information through the central server;
   a second conversion tool that connects to the second open architecture interface for assigning a classification to the data information being transmitted from the central server to the system client according to a predetermined classification scheme;
   a third conversion tool that connects to the third open architecture interface for the formatting responses that are being transmitted from the central server to the system client according to a predetermined format with the format being such that content of the web applications may be manipulated by the client controls at the system client;
   a first development tool that connects to the fourth open architecture interface for receiving and processing new web applications for operation on the system, the first development tool connecting to the system client through the central server and the communications link and for receiving and processing requests received from the system client for new web applications; and
   a second development tool that connects to the fifth open architecture interface for receiving and processing requests that have been processed by the first development tool, with the second development tool being connected to the first development tool through the central server, and with the second development tool being connected to at least the second storage element from which data information associated with the new web applications may be retrieved.

33. The system as recited in claim 32, wherein the system client includes a web browser.

34. The system as recited in claim 33, wherein the web browser includes a personal computer or computer workstation.

35. The system as recited in claim 32, wherein the client manager includes a dynamic hyper-text mark-up language ("DHTML") manager.

36. The system as recited in claim 35, wherein the third conversion tool formats responses in a DHTML format for input to the DHTML manager at the system client.

37. The system as recited in claim 32, wherein the system client is formed within an extensible mark-up language ("XML") environment for communications to and from the central server.

38. The system as recited in claim 32, wherein the communications link between the system client and the central server is according to a predetermined protocol.

39. The system as recited in claim 38, wherein the protocol for the communications link includes hyper-text transmission protocol ("HTTP").

40. The system as recited in claim 39, wherein the client controls have input means for the system user to interact with existing and new web applications to request data information based on an intent and a purpose of web applications, to cause the display of the data information that is received from the central server, and to manipulate data information received from the central server to include at least manipulation of content of web applications.

41. The system as recited in claim 32, wherein central server includes a server application with a server object and the third open architecture interface connects to the server object.

42. The system as recited in claim 41, wherein the server application includes servlets and the second open architecture interface connects to the servlets.

43. The system as recited in claim 32, wherein the central server code includes RPG code.

44. The system as recited in claim 43, wherein the first conversion tool concatenates code to existing RPG code.

45. The system as recited in claim 44, wherein the first conversion tool concatenates RPG code to existing RPG code.

46. The system as recited in claim 32, wherein the first, second, and third conversion tools convert existing web applications for enabling them at the system client.

47. The system as recited in claim 32, wherein the first and second development tools are for enabling new web applications at the system client.

48. A three tier web-based computer system for enabling web application at a presentation tier, comprising:
    the presentation tier for controlling processing displaying data information formatted according to a predetermined format received from a middle tier, and for at least manipulating content of web applications;
    a communications link for connecting the presentation and middle tiers;
    the middle tier for processing requests from the presentation tier for data information stored in a first storage element of the web-based computer system, transmitting data information formatted according to a predetermined format to the presentation tier;
    a business tier for processing requests received from the middle tier and controlling the retrieval of data information from the first storage element based on the requests;
    a first storage element for storing data information that is capable of being retrieved based on requests sent from the system client;
    a second storage element of the web-based computer system for storing data information that is capable of being retrieved based on requests sent from the presentation tier;
    a first open architecture interface that connects to a first location of the business tier;
    a second open architecture interface that connects to a first location of the middle tier;
    a third open architecture interface that connects to a second location of the middle tier;
    a fourth open architecture interface that connects to a third location of the middle tier;
    a fifth open architecture interface that connects to a second location of the business tier;
    a first conversion tool that connects to the first open architecture interface for adding code to business tier code, with the added code for controlling the transmission path of data information through the business tier;
    a second conversion tool that connects to the second open architecture interface for assigning a classification to the data information being transmitted from the middle tier to the presentation tier according to a predetermined classification scheme;
    a third conversion tool that connects to the third open architecture interface for the formatting responses that is being transmitted to the presentation tier according to a predetermined format with the format being such that content of the web applications may be manipulated by the client controls at the presentation tier;
    a first development tool that connects to the fourth open architecture interface for receiving and processing new web applications for operation on the system, the first development tool connecting to the presentation tier through the middle tier and the communications link, and for receiving and processing requests received from the presentation tier for new web applications; and
    a second development tool that connects to the fifth open architecture interface for receiving and processing requests that have been processed by the first development tool, with the second development tool being connected to the first development tool through the middle and business tiers, and with the second development tool being connected to at least the second storage system from which data information associated with the new web applications may be retrieved.

49. The system as recited in claim 48, wherein the presentation tier includes a web browser.

50. The system as recited in claim 49, wherein the web browser includes a personal computer or computer workstation.

51. The system as recited in claim 49, wherein the presentation tier includes a dynamic hyper-text mark-up language ("DHTML") manager.

52. The system as recited in claim 51, wherein the presentation tier is formed within an extensible mark-up language ("XML") environment for communications to and from the middle tier.

53. The system as recited in claim 51, wherein the third conversion tool formats responses in a DHTML format for input to the DHTML manager at the presentation tier.

54. The system as recited in claim 4, 22, 35, or 51 wherein the client manager includes a DHTML/XML (extensible mark-up language) manager.

55. The system as recited in claim 48, wherein the communications link between the presentation tier and the middle tier is according to a predetermined protocol.

56. The system as recited in claim 55, wherein the protocol for the communications link includes hyper-text transmission protocol ("HTTP").

57. The system as recited in claim 56, wherein the presentation tier has input means for a system user to interact with existing and new web applications to request data information based on an intent and a purpose of web applications, to cause the display of the data information that is received from the middle tier, to manipulate data information received from the middle tier that includes manipulation of content of web applications.

58. The system as recited in claim 48, wherein the business tier includes business tier code for controlling access to the first storage system.

59. The system as recited in claim 58, wherein business tier code includes RPG code.

60. The system as recited in claim 59, wherein the first conversion tool concatenates code to existing RPG code.

61. The system as recited in claim 60, wherein the first conversion tool concatenates RPG code to existing RPG code.

62. The system as recited in claim 48, wherein the first, second, and third conversion tools convert existing web applications for enabling them at the presentation tier.

63. The system as recited in claim 48, wherein the first and second development tools are for enabling new web applications at the presentation tier.

64. A method for converting existing web applications on a web-based computer system for enabling web applications at a system client, with the web-based computer system including the system client with a client manager, display, and client controls; a communications link for connecting the system client to a central server; the central server with a server application, display files, and central server code; and at least one storage element, comprising the steps of:
  (a) converting central server code by adding new code to central server code with the new code for causing transmission of data information through the central server to by-pass the display files and be processed by a display object;
  (b) classifying at the central server data information retrieved from the storage element according to a classification scheme of the display files;
  (c) formatting at the central server retrieved data information being transmitted to the system client so that the retrieved data information may be displayed and manipulated at the system client that includes at least content of the web applications being manipulated at the system client.

65. A method for converting existing web applications on, and adding new web applications to, a web-based computer system for enabling existing and new web applications at a system client, with the web-based computer system the including the system client with a client manager, display, and client controls; a communications link for connecting the system client to a central server; the central server with a server application, display files, and central server code; and at least a first and second storage element, comprising the steps of:
  (a) converting existing web applications by
    (1) converting central server code by adding new code to central server code with the new code for causing transmission of data information through the central server to by-pass the display files and be processing by a display object;
    (2) classifying at the central server data information retrieved from the first storage element according to a classification scheme of the display files; and
    (3) formatting at the central server data information being transmitted to the system client so that the data information retrieved from the first storage element may be displayed and manipulated at the system client and content of the web applications may be manipulated at the system client; and
  (b) adding new web applications by
    (1) adding new web applications to a first development tool that connects to the central server and the first development tool connects to the system client through the central server and the communications link, with the first development tool for receiving and processing requests received from the system client for new web applications; and
    (2) processing with a second development tool requests that have been processed by the first development tool, with the second development tool being connected to the first development tool through the central server, and with the second development tool being connected to at least the second storage element from which data information associated with the new web applications may be retrieved.

* * * * *